May 5, 1953  E. C. BURDICK  2,637,301
AIR ACTUATED POWER CYLINDER CONTROL WITH RATE RESPONSE
Filed Aug. 26, 1947  3 Sheets-Sheet 1

*INVENTOR.*
EDWIN C. BURDICK
BY Arthur H. Swanson
ATTORNEY

May 5, 1953  E. C. BURDICK  2,637,301
AIR ACTUATED POWER CYLINDER CONTROL WITH RATE RESPONSE
Filed Aug. 26, 1947  3 Sheets-Sheet 2

INVENTOR.
EDWIN C. BURDICK

BY Arthur H. Swanson
ATTORNEY

May 5, 1953 E. C. BURDICK 2,637,301
AIR ACTUATED POWER CYLINDER CONTROL WITH RATE RESPONSE
Filed Aug. 26, 1947 3 Sheets-Sheet 3

INVENTOR.
EDWIN C. BURDICK
BY Arthur H. Swanson
ATTORNEY

Patented May 5, 1953

2,637,301

UNITED STATES PATENT OFFICE 2,637,301

AIR ACTUATED POWER CYLINDER CONTROL WITH RATE RESPONSE

Edwin Clark Burdick, Philadelphia, Pa., assignor, by mesne assignments, to Minneapolis-Honeywell Regulator Company, Minneapolis, Minn., a corporation of Delaware Application August 26, 1947, Serial No. 770,560

11 Claims. (Cl. 121—41)

The present invention relates to control apparatus of the general type disclosed in the Moore Patent 2,237,038 of April 1, 1941, in which a relay or servo-motor in the form of a power cylinder has a piston moved by variations in relative air pressures which act thereon in opposite directions and are produced by a pilot valve mechanism in response to variations in a control force which is automatically varied by changes in a controlling condition. The latter may be a temperature, a pressure, a rate of flow or some other physical or chemical condition or force. The controlling force which varies with the controlling condition may be an electric force, a fluid pressure or some other mechanical force varying with the controlling condition. In many cases it may well be the bleed nozzle pressure of an air controller included in a measuring and control instrument of conventional type.

Air actuated power cylinders of the above mentioned type are well adapted and extensively used to adjust regulating devices, such as large valves which require considerable power for their adjustment. Such an air actuated power cylinder operates to position the control element which it adjusts, accurately and with suitable promptness under some conditions. Under other conditions, however, air actuated power cylinders over-travel as a result of the inertia of the power cylinder piston, the final control element and their operating connections between said piston and control element which are in motion when they reach the positions at which they should come to rest. Such over-travel requires at least one reverse adjustment, and in some cases results in continuous oscillation of the final control element back and forth through the position in which it should be maintained.

The general object of the present invention is to provide a control system for an air actuated power controller with practically effective means for eliminating or greatly reducing the tendency to over-travel and hunting. More specifically, the object of the invention is to supplement or modify the proportional or position type control of the power cylinder piston and ultimate control element movements, with rate control means responsive to the speed at which the piston and ultimate control element approach the respective positions in which they should stop, and operative to create an arresting force which will prevent over-travel. A specific object of the present invention is to provide a speed control unit adapted for incorporation in the control system of an air actuated power cylinder having the general structural and operating characteristics of the apparatus disclosed in said prior Patent 2,237,038.

In control apparatus of the type involved, heretofore in use, air under pressure for moving the power cylinder piston toward its desired position, is supplied to the power cylinder continuously, up to the instant at which the piston reaches the position in which it should stop. In accordance with my invention, the supply of air to the cylinder is reduced as the piston approaches its control point position, and the latter is subject to a return force which increases with the speed of piston movement and acts to reduce the piston velocity to zero as the piston reaches the desired control position.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
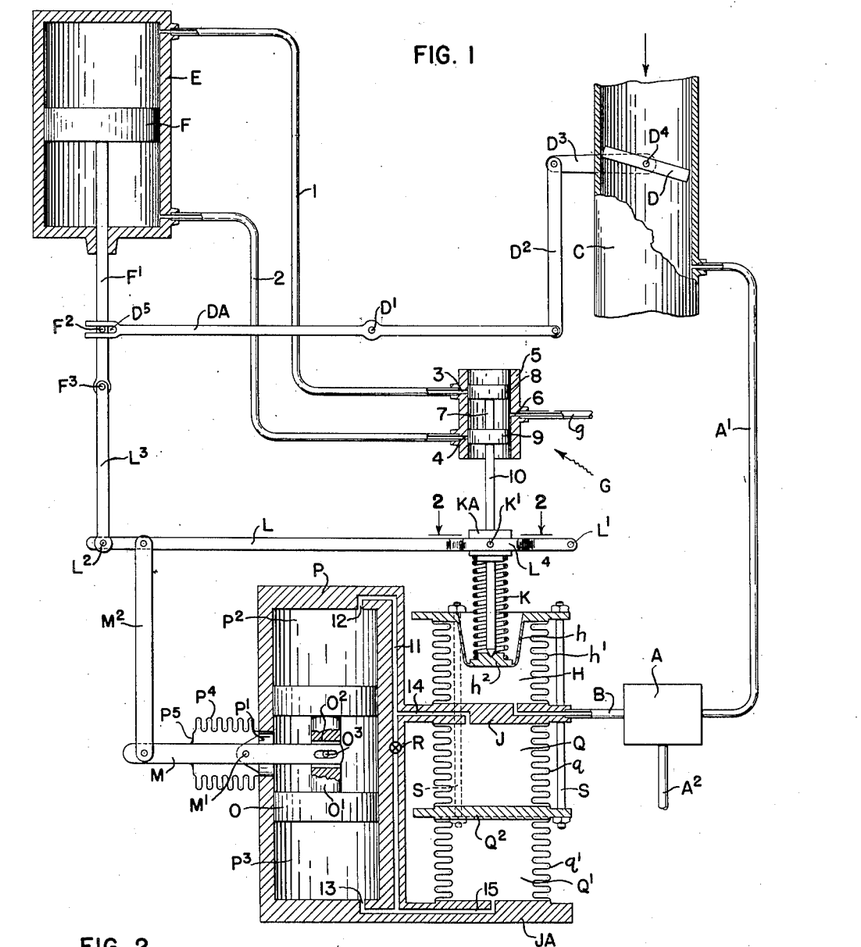
Fig. 1 is a diagrammatic sectional elevation of one embodiment of the present invention.

In the arrangement shown diagrammatically in Fig. 1, A presents a control instrument including an air controller maintaining a pressure in a transmission pipe B which is proportional to the controlling condition. The latter may be, for example, the fluid pressure at the outlet side of a butterfly valve D in a conduit C through which fluid flows in the direction of the arrow at a rate determined by a demand over which the apparatus shown has no control. The valve D is adjusted by means of a power cylinder E having the stem F' of its piston F connected through a lever DA and link $D^2$ to a crank arm $D^3$ carried by the shaft $D^4$ of the valve D. The lever DA turns about a fulcrum pivot D' and has its end remote from the valve D formed with a slot $D^5$ receiving a pivot pin $F^2$ carried by the stem F'.

The power cylinder piston F is adjusted by varying the relative pressures acting on the opposite sides or ends of the piston F.

As shown, the air spaces in the end portion of the cylinder E above and below the piston F are connected by pipes 1 and 2, respectively, to the ports 3 and 4 in the tubular body portions 5 of the pilot valve G. The ports 3 and 4 are spaced apart in the longitudinal direction of the valve body and intermediate those ports the valve body is formed with a port 6 for connection by a pipe $g$ to the source (not shown) of the air under pressure used in giving movements to the piston F. In the conventional form shown, the valve body 5 is an open ended cylinder or tube in which a piston valve 7 is mounted for movement between the upper and lower end portions through an intermediate neutral position. In the neutral position of the valve member which is shown in Fig. 1, the ports 3 and 4 are closed by spaced apart piston portions 8 and 9, respectively, of the valve member 7. On movement of the valve member from its intermediate position to its upper end position, the pipe 1 is placed in communication with the pressure supply pipe $g$ through the ports 3 and 6 and the portion of the valve body bore between the pistons 8 and 9, while at the same time, the pipe 2 is connected to the atmosphere through the port 4 and the lower open end of the valve chamber. When the valve member is moved downward as seen in Fig. 1 from its intermediate position, the pipe 2 is connected to the supply pipe $g$ through the ports 4 and 6 and intermediate portion of the valve chamber, and the pipe 1 is placed in communication with the atmosphere through the port 3 and the open upper end of the valve chamber.

The adjustment of the valve member 7 upward from its neutral position thus results in the passage of air under pressure into the space above the piston F and the opening of the cylinder space beneath the piston F to the atmosphere, and thus gives down movement to the piston F. Conversely, an adjustment of the valve member 7 downwardly from its intermediate position results in admission of air under pressure to the cylinder space beneath the piston F and the opening of the cylinder space above the piston to exhaust, with a resultant upward movement of the piston F.

The variable controlling air pressure established by the instrument A is transmitted by the pipe B to the interior of an expansible chamber H having a movable end wall $h$. The expansible chamber H may take various forms. The measuring instrument A may be of conventional form including means for measuring the pressure transmitted to the instrument from the conduit C by the pipe A', and including an air controller A connected by a pipe $A^2$ to a source of air under pressure and operating to maintain a pressure in the pipe B proportional to the pressure in the pipe A'. As shown in Fig. 1, the expansible chamber H is in the form of a bellows having a lower stationary end wall J, and comprising a tubular corrugated metallic wall or body $h'$ connected to one end to the stationary end wall J, and at its other end to the movable chamber wall $h$.

Figure 2:
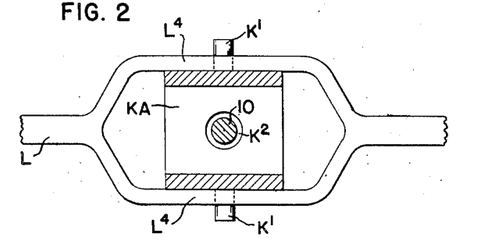
Fig. 2 is a plan section on the line 2—2 of Fig. 1.

The tendency of the expansible chamber H to elongate and move its end wall $h$ away from its stationary end wall J is opposed by a calibration spring K which acts as a compression spring between the movable end wall $h$ of the element H and an abutment member KA. The latter is adjusted toward and away from the element H in proportion to the longitudinal movements of the piston F in the cylinder E. As shown in Figs. 1 and 2, the abutment member KA is pivotally connected to a lever L at a point intermediate the stationary fulcrum pivot L' at one end of the lever, and a pivot $L^2$ carried by the lever at its opposite end. A link $L^3$ connects the lever pivot $L^2$ to a pivot $F^3$ carried by the stem F'' of the piston F.

As shown in Figs. 1 and 2, the abutment member KA is a yokelike structure with trunnion pivots K' at its opposite sides journalled in the side walls $L^4$ of an opening in the lever L in which the member KA is received. The member KA is formed with an opening $K^2$ through which the piston stem 10 of the pilot valve G loosely passes. The tapered lower end of the stem 10 engages a centering recess or seat $h^2$ in the movable end wall $h$. The valve member 7 is biased, gravitationally in the arrangement shown in Fig. 1, to bear against the movable end wall $h$. Preferably, the "zero position" pressure in the chamber H is made some small finite value such as two or three pounds per square inch so that gravitational forces are not required for maintaining the piston stem 10 in engagement with the movable end wall $h$. In consequence, the valve member 7 is moved into and away from its neutral position as the end wall $h$ moves toward and away from its neutral or normal position. In the normal or neutral position of the end wall $h$, the upwardly acting pressure force of the air transmitted to the expansible chamber H through the pipe B balances the downwardly acting force impressed on the member H by the spring K. The gravitational bias force with which the stem 10 engages the wall $h$ is too small to be of practical significance in this connection.

The normal position of the movable end wall $h$ of the chamber H corresponds to the neutral position of the pilot valve member 7 and it must be the same for all positions of the piston F. In consequence, the compression of the spring K and the spring force which it exerts against the bellows end wall $h$ are each proportional to the displacement of the piston F from the upper end of its vertical range of movement in the cylinder E when the latter is vertically disposed, as is assumed in Fig. 1. The parts of the apparatus shown in Fig. 1 cannot come to rest with the valve member 7 in its closed position unless the force acting downwardly on the bellows end wall $h$ equals the force acting upwardly on the wall $h$ due to the controlling pressure then existing in the expansible chamber H. The spring K is referred to herein as a calibration spring, because its ratio of elongation and contraction in response to increases and decreases in the compression force acting on it determines the ratio of the movement of the piston F to the change in the controlling pressure in the chamber H which produces such movements. It is to be understood, that with apparatus of the character disclosed herein, it is immaterial, in general, whether the axis of the power cylinder is perpendicular, parallel or inclined to the horizontal, and the references made herein to the positions of parts relative to the horizon, are made merely for convenience of description. However, when there is need for a bias force such as that required to keep the pilot valve stem in engagement with the wall $h$, that bias force must be some force other than gravity, such as spring force, when the disposition of the apparatus does not provide the gravitational bias force.

The rate control action of the apparatus shown in Fig. 1, provided in accordance with the present invention, is effected through a lever M which is connected to the piston F so as to be oscillated about its fulcrum M' as the piston F reciprocates in the cylinder E. As shown, one end of the lever M is connected to the piston F through a link M² which directly connects one end of the lever M to the lever L. The second end of the lever M is pivotally connected to a piston element O working in the chamber of a cylinder structure P. As shown, the piston structure O comprises upper and lower piston portions spaced away from one another and mechanically connected by a stem portion O' of reduced cross section and formed with a slot O² into which the second end of the lever M extends. A pivot pin O³ extending across, and having its ends anchored in the side walls of the slot O², extends through a slot in the lever M and thereby pivotally connects the latter to the piston structure O.

The lever M extends through an opening P' in the wall of the cylinder chamber P intermediate the end portions P² and P³ of the chamber space in the cylinder P. Leakage through the opening P' is prevented by a bellows seal comprising a bellows tube P⁴ which has one end welded or brazed to the portion of the cylinder P at the margin of the opening P'. The other end of the bellows tube is connected to a bellows end wall P⁵ through which the lever M extends. The bellows end wall P⁵ may be welded or brazed to the lever M to prevent leakage between the end wall and lever M. Each of the end portions of the piston O which are connected by the stem O' may be individually considered as a separate single acting piston but the piston end and stem portions C collectively form a single double acting piston. The separation of the end portions of the piston, as shown, permits the lever M to be directly connected to the piston, and to extend into the cylinder through the lateral opening P' which can be readily sealed, if necessary, to avoid leakage. The cylinder end spaces P² and P³ above and below the piston element, respectively, may contain a fluid which may well be oil or other liquid, but may be air. In some cases the fluid may be continuously supplied as required to make up for leakage through the opening P', and the bellows P⁴ may then be omitted.

The end spaces P² and P³ in the cylinder P are connected by a conduit 11 opening to the space P² through an upper end wall port 12, and opening to the space P³ through a bottom end wall port 13. The conduit 11 includes a restriction R which is preferably adjustable and may well include a needle valve. A branch 14 from the portion of the conduit 10 between the port 12 and restriction R is connected to an expansible chamber Q, and a branch 15 from the portion of the conduit 10 between the port 13 and the restriction R is connected to an expansible chamber Q.

Fluid flow past the restriction R creates a pressure drop between the portions of the conduit 11 at opposite sides of the restriction R and a corresponding differential between the pressures in the expansible chambers Q and Q' which is transmitted to the movable wall $h$ of the expansible chamber H, as hereinafter explained. As diagrammatically shown in Fig. 1, the chamber Q is formed by a corrugated metallic bellows $q$ which is connected at its upper end to the underside of the stationary end wall J of the chamber H. The lower end of the bellows $q$ is connected to a movable wall Q². The latter is connected to the upper end of a corrugated metallic bellows $q'$ which surrounds the chamber Q' and has its lower end secured to a stationary end wall JA. As diagrammatically shown in Fig. 1, the stationary bellows end wall members J and JA are integrally connected to the cylinder structure P. As shown, the chambers Q and Q' are of the same diameter and are coaxial with the chamber H, and the common movable end wall of the chambers Q and Q' are rigidly connected to the movable wall $h$ of the chamber H by rods or bolts S.

In the normal contemplated operation of the apparatus shown in Fig. 1, an increase or a decrease in the pressure transmitted from the conduit C through the pipe A' to the instrument A, causes the latter to correspondingly increase or decrease the pressure transmitted by the pipe B to the expansible chamber H. If the pilot valve G had previously been in its neutral condition, such a pressure change elongates or contracts the chamber H and thereby effects a corresponding movement of the pilot valve G away from its normal neutral position. The expansion or contraction of the chamber H, effected as just described, is necessarily attended by a fluid flow from one of the chambers Q and Q' into the other, through the flow path formed by the conduits 14 and 15 and the connecting portion of the conduit 11 which includes the flow restriction R. A relatively large and rapid pressure change in the chamber H cannot produce a correspondingly large and rapid adjustment of the pilot valve because of the retarding action of the restriction R on the transfer of fluid between the chambers Q and Q'. However, under operating conditions which can be expected to be normal in most uses of the invention, the change in the control pressure in the chamber H will not be sufficiently abrupt and great to make the retarding action of the restriction R significant in respect to the rate at which the pressure change elongates or contracts the chamber H. Moreover, a delay in the movement of the end chamber H relative to the change in the pressure acting on the underside of the wall $h$, merely works a corresponding delay in the adjustment of the piston F effected as a result of the said pressure change.

When the pressure change in the chamber H is an increase, it results in an up movement of the wall $h$ and pilot valve member 8, so that the air under pressure may then pass from the supply pipe $g$ through ports 6 and 3 and pipe 1 to the upper end portion of the air cylinder E, and so that the air may then escape from the lower end portion of the cylinder E to the atmosphere through the pipe 2 and port 4. The resultant down movement of the piston F produces four effects, namely: A closing adjustment of the butterfly valve D effected through the lever D'; a compression of the spring K effected through the lever L; an up movement of the piston O in the cylinder P effected through the lever M; and a down movement of the wall $h$ of the control pressure chamber H, with a resultant return to neutral movement of the pilot valve member 7.

The described compression of the spring K increases the force acting downwardly on the end wall $h$ of the chamber H by an amount substantially equal to the increase in the force acting upwardly on the wall $h$ produced by the increase in pressure in the chamber H which has caused the down movement of the piston F. Such compression of the spring K would depress the wall $h$ and thereby of itself return the pilot valve member 8 to its neutral position, but for the connections between the two expansible chamber walls $h$ and $Q^2$. In consequence of that connection, down movement of the member $h$ cannot occur without a movement of fluid out of the chamber Q' through the conduit branch 15 and a flow of fluid into the chamber Q through the branch 14.

The down movement of the piston F produces a down movement of the wall $h$ as a result of the up movement which it gives to the piston structure O. That up movement moves fluid from the space $P^2$ into the space P through the restriction $R^3$, and moves fluid from the chamber space $P^2$ into the expansible bellows chamber Q and draws fluid into the space $P^3$ from the chamber Q'. Fluid thus moves into the chamber Q and out of the chamber Q' because the pressure in the cylinder space $P^2$ and chamber Q is then higher than the pressure in the cylinder end space $P^3$ and chamber Q' as a result of the drop in the pressure flowing past the restriction R. That pressure drop is given by the formula $$P_1 - P_2 = AV^2$$

In the foregoing equation $P_1$ and $P_2$ are the fluid pressures at the inlet and outlet sides of the restriction R, V is the velocity of fluid flow past the restriction R, and A is a constant. The magnitude of the constant A depends on the character of the flow passage through or past the restriction R.

The fact that the lowering of the abutment member KA and resultant increase in the downwardly acting force which the spring K exerts against the wall $h$ does not cause or directly contribute to the down movement of the wall $h$ produced by a down movement of the piston F, becomes apparent when account is taken of the fact that the pressure acting downwardly on the wall $h$ tends of itself to make the pressure in the chamber Q' greater than the pressure in the chamber Q. While the effect of the down movement of the abutment KA on the calibration spring K does not directly contribute to the down movement of the wall $h$, it serves the important purpose of fixing the magnitude of the control pressure in the expansion chamber H required to hold the pilot valve G in its neutral position for the particular position in which the piston F is left at the end of the regulatory action initiated by an increase in the control pressure transmitted to the chamber H through the pipe B.

As previously indicated, the characteristics of the calibration spring K predetermine the position to which power cylinder piston E must move to establish equilibrium in the control system for any particular control pressure in the control chamber H. The variations in the compression of the spring K as the piston E is moved is essential to the attainment of position control, and for the attainment of position control, the cylinder P and chambers Q and Q' are not required. However, the cylinder P with its piston O moved in proportion to the movements of the piston F, the associated expansible chambers Q and Q' and their conduit connections including the restriction R, collectively form a speed or rate control unit. That unit serves the useful and practically important purpose of decreasing the velocity of movement of the piston F as it approaches the new position which it should assume as a result of a new controlling pressure established in the chamber H. With the apparatus suitably designed and proportioned with respect to the inertia of the piston F and associated parts, the velocity of the piston E will diminish to zero as the piston moves into the position corresponding to the new control pressure in the chamber H following a change in that pressure. This substantially precludes any tendency of the piston F to hunt or over-travel.

While resistance to the movement of the piston O directly opposes and tends to retard movement of the piston F, the primary control effect of the speed or rate control unit on the movement of the piston F is effected through the pilot valve G. The operative effect of said unit on the valve G is to subject its ports 3 and 4 to a progressively increasing throttling effect as the piston F approaches the position in which it should come to rest. Stated differently, the speed control unit produces an effect on the control valve member 7 tending to close the ports 3 and 4 at a time which anticipates the movement of the control cylinder piston F into the new control position which it should assume, by an amount which is proportional to the speed of said piston F. Thus the speed or rate control mechanism makes the speed of the power cylinder piston F a function of the required movement of that piston, so as to reduce the speed of the piston to zero as the control position is attained. The piston F cannot come to rest until it reaches the control position corresponding to the control pressure in the chamber H because as the piston speed approaches zero, the operative condition of the pilot valve G becomes substantially subject only to the positioning control action of the opposing forces impressed on the wall $h$ due to the control pressure in the space beneath said wall and to the compression of the calibration spring K.

Figure 3:
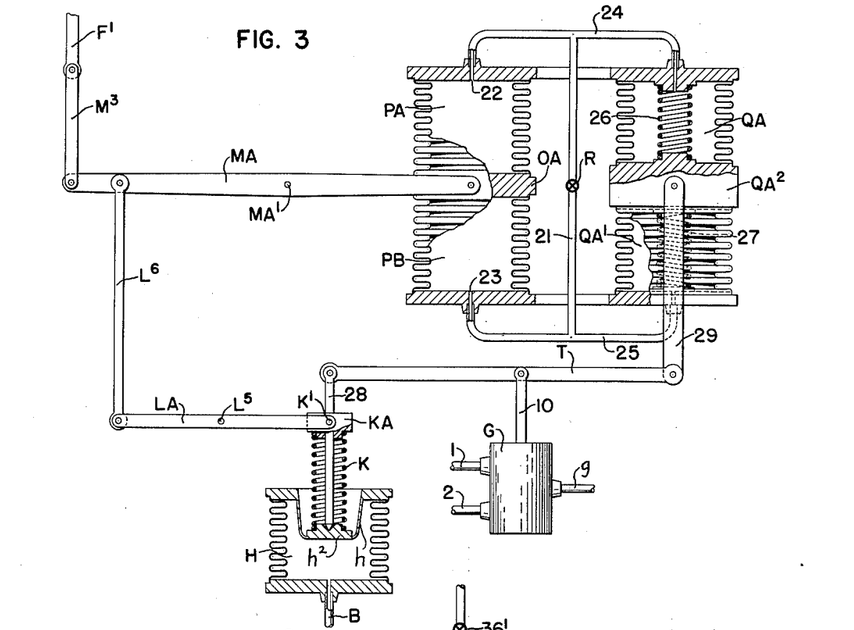
Fig. 3 is a diagrammatic section elevation illustrating a modification.
Figure 4:
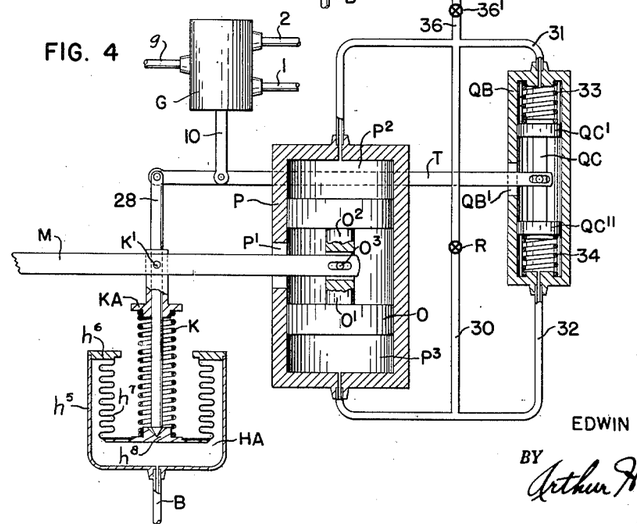
Fig. 4 is a sectional elevation illustrating a modification.
Figure 5:
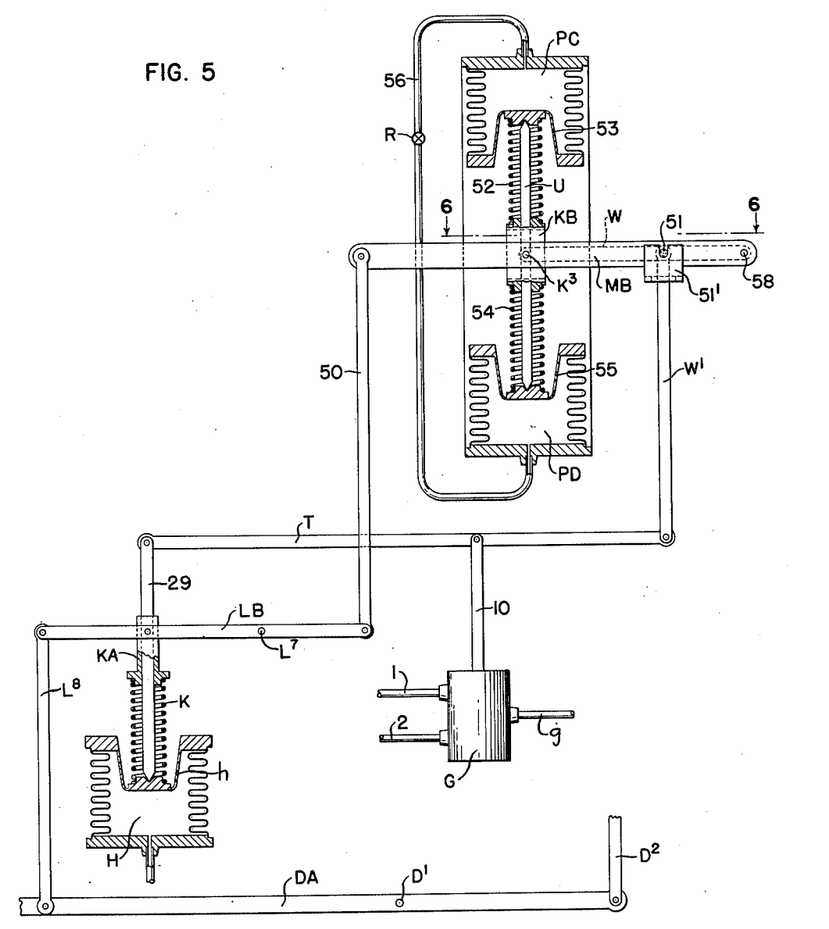
Fig. 5 is a sectional elevation illustrating a third modification.

Apparatus operating in the same general manner and producing the same general results as the apparatus shown in Fig. 1 may take various forms, some of which are shown in Figs. 3–7. For example, the rate control mechanism may include expansible chambers of the bellows type in lieu of those formed by the cylinder P and piston structure O of Fig. 1, as is illustrated in Fig. 3; and in lieu of the use of the bellows chambers Q and Q' of Fig. 1 for subjecting the movable wall $h$ of the controlling pressure chamber H to a rate control force, use may be made of expansible chambers of the cylinder and piston type, as is illustrated in Fig. 4; and in lieu of the rigid connections S between the rate control wall element $Q^2$ and the movable wall $h$, so that each of those walls and the movable pilot valve member 7 have the same reciprocating movements, as shown in Fig. 1, said valve member may be operatively connected to the wall $h$ and the rate control mechanism through a floating lever T, as is shown in Figs. 3, 4 and 5.

In the form of the invention illustrated in Fig. 3, the rate control apparatus comprises expansible bellows chambers PA and PB having a common movable end wall OA and having their remote end walls stationary. The end wall OA is pivotally connected to a lever MA turning about a stationary fulcrum pivot MA' and connected by a link $M^3$ to the stem F' of a power cylinder (not shown), which may comprise a cylinder E in which a piston F works, as shown in Fig. 1. The oscillation of the lever MA thus operates to transfer a fluid which may be a liquid or air out of one and into the other of the chambers PA and PB through a conduit 21 extending between ports 22 and 23 in the stationary end walls of the chambers PA and PB, respectively, and including a restriction R. A pipe 24 connects the portion of the conduit 21 between the port 22 and the restriction R to a bellows chamber QA, and a conduit 25 connects a portion of the conduit 21 between the bellows chamber PB and the restriction R into a bellows chamber QA'. The chambers QA and QA' are in axial alignment and have their adjacent ends connected by a common end wall member QA$^2$. The opposite ends of the bellows walls of the chambers QA and QA' are connected to stationary end wall portions. The movable end wall QA$^2$ is biased to a predetermined intermediate position by compression springs 26 and 27 acting between the opposite sides of the movable wall QA$^2$ and the stationary end walls of the chamber QA and QA', respectively.

In Fig. 3, the abutment KA for the calibrating spring K is pivotally connected to one end of a lever LA mounted on a stationary fulcrum pivot L$^5$ and connected by a link L$^6$ to the lever MA and thereby to the stem F' of the power cylinder piston. The connection between the piston stem F' and abutment KA is thus operatively the same in Fig. 3 as in Fig. 1.

In the form of the invention shown in Fig. 3, the stem 10 of the piston valve G is pivotally connected to a floating lever T intermediate the ends of the latter. One end of the lever T is operatively connected to the wall $h$ of the chamber H by a strut 28 pivotally connected at its upper end to one end of the lever T and having its tapered lower end gravitationally held in engagement with the recessed seat $h^2$ of the end wall $h$. As explained in connection with the apparatus embodiment of Figure 1, the "zero position" pressure in chamber H may be made a small value of two or three pounds per square inch so that gravitational forces are not required to maintain the strut 28 in engagement with the recessed seat $h^2$ of the end wall $h$. The second end of the lever T is connected by a link 29 to the common movable end wall QA$^2$ of the bellows chambers QA and QA'. In operation an up or down movement of the stem F' produces a down or up movement, respectively, of the movable wall OA and the abutment KA. The down or up movement of the wall OA produces an up or down movement, respectively, of the movable wall Q$^2$ and a corresponding up or down movement, respectively, of the pilot valve stem 10. The down or up movement of the abutment K$^2$, respectively increases or decreases the tension of the spring K and thereby normally produces a down or up movement, respectively, of the wall $h$ and corresponding movement of the element 28 and of the left hand end of the floating lever T. The opposite ends of the floating lever T are thus given movements in opposite directions by a movement of the stem F' in either direction. However, the position of the abutment KA is in fixed relation at all times to the position of the stem F', but the slow equalization of the pressures in the chambers PA and PB through the conduit 21 with its restriction R, results in the delayed return of the wall QA$^2$ to a normal position following each movement of the stem F' in either direction. As will be apparent without further explanation, the adjustments of the pilot valve stem 10 of Fig. 3 in response to the expansion and contraction of the expansible control chamber H, are similar in character to those obtained with the apparatus shown in Fig. 1, and the apparatus shown in Fig. 3 may be so designed and proportioned that the adjustments of the pilot valve stem 10 resulting from any given change in the control pressure transmitted to the chamber H will be substantially identical in magnitude and timing with the adjustments of the stem 10 effected with the apparatus shown in Fig. 1. In particular, the rate control mechanism including the bellows chambers PA, PB, QA and QB of Fig. 3, may be proportioned and arranged to reduce the velocity of movement of the power cylinder piston to zero, just as it is reduced with the speed or rate control mechanism shown in Fig. 1.

In the form of the invention shown in Fig. 4, the rate control mechanism includes a cylinder P with a piston structure O working therein and connected to a lever M, all as in Figs. 1 and 2. In Fig. 4, however, the expansible chamber HA to which the control pressure is supplied by the pipe B, differs in form, though not operatively, from the chamber H shown in Fig. 1, in that it comprises a bellows element $h^7$ connected at one end to an annular member $h^6$ forming part of the wall of a pressure chamber space HA surrounding the bellows element $h^7$. The latter is secured at its upper end to the part $h^6$ and has its lower end $h^8$ closed and provided with a seat for the calibration spring K and for the strut or link 28 through which one end of the floating lever T is gravitationally held in operative engagement with the expansible chamber HA. The calibration spring K acts between the lower closed end $h^8$ of the bellows $h^7$ and a spring abutment KA which is pivotally connected to the lever M. In Fig. 4, the second end of the lever T of Fig. 4 is pivotally connected to a stem QC connecting piston portions QC' and QC'' which work in a cylinder QB. Operatively, the cylinder QB, with the piston and springs therein, corresponds to the bellows chambers QA and QA', springs 26 and 27 and movable element QA$^2$ of Fig. 3.

In Fig. 4, the opposite ends of the chamber P are connected by a conduit 30 including a restriction R. The upper end of the cylinder QB is connected by conduit 31 to the portion of the conduit 30 connecting the restriction R to the cylinder space P$^2$. The lower end of the cylinder QB is connected by a conduit 32 to a portion of the conduit 30 connecting the chamber P$^3$ to the restriction R. In Fig. 4, the opposite ends of the piston structure including the stem and piston parts QC, QC' and QC'', are engaged by compression springs 33 and 34, which bias said piston structure to an intermediate position just as the springs 26 and 27 bias the movable element QA$^2$ of Fig. 3 to its mid-position. To make up for leakage, the conduit 30 is shown as connected through a conduit 36, which may include a cut-off valve 36', to an oil reservoir, compressed air tank or other source of the fluid contained in the closed portions of the cylinder chambers P$^2$ and P$^3$, in the end portions of cylinder QB and in the conduits 30, 31 and 32. The apparatus shown in Fig. 4 has the same general combined positioning and rate control characteristics as the apparatus shown in Figs. 1 and 2 and in Fig. 3.

The apparatus shown in Fig. 5 differs from the apparatus shown in the other figures essentially only in respect to the construction and operation of the speed or rate control mechanism acting on the pilot valve G through a link W' connected to one end of a floating lever T. Positioning control adjustments are given the other end of the lever T by apparatus quite similar to that shown in Fig. 3. Thus in Fig. 5, the abutment member KA is pivotally connected to a lever LB turned about a fulcrum pivot $L^7$ by a link $L^8$ connecting the lever LB to a lever DA. The latter may be connected at one end to a power cylinder piston and at the other end to a butterfly valve or other ultimate control element, exactly as is the lever DA of Fig. 1. The second end of the lever LB is connected by a link 50 to one end of a lever MB, the fulcrum for which comprises trunnion pivots 51 carried by the lever and journalled in stationary bearing members 51'.

Figure 6:
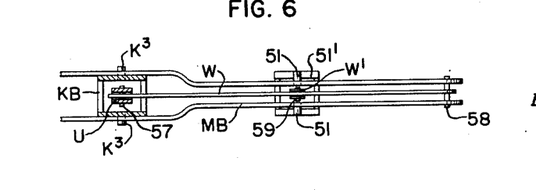
Fig. 6 is a partial section on the line 6—6 of Fig. 5.

Between the pivots 51 and its connection to the link 50, the lever MB is pivotally connected to a spring abutment yoke KB. The yoke KB has trunnion pivots $K^3$ at its opposite sides journalled in the opposite side portions of the lever MB. As is indicated in Fig. 6, the lever MB comprises two spaced apart, side by side longitudinal portions between which the yoke KB is located. The compression spring 52 acts between the upper end of the yoke KB and the lower movable end wall 53 of a bellows chamber PC. Similarly, a spring 54 acts between the lower end of the abutment member KB and the upper movable end wall 55 of an expansible bellows chamber PD. The chambers PC and PD have stationary end walls at their ends remote from the yoke KB. The expansible chambers PC and PD are connected by a conduit 56 including a flow restriction R. The conduit and chambers PC and PD are filled with fluid which may be oil or other liquid, or may be air under a pressure which is preferably somewhat above atmospheric pressure.

The two bellows chamber end walls 53 and 55 are maintained at a fixed distance apart by a link or strut U which has its opposite ends in abutting engagement with said end walls and passes loosely through a central passage formed for the purpose in the abutment member KB. The member U is pivotally connected intermediate its ends to one end of a lever W by a pivot pin 57. The lever W, shown in Fig. 7, is located between and is generally parallel to the two, side by side sections of the lever W. The second end of the lever W is pivotally connected by a pivot 58 to the lever MB at some distance to the right of the trunnion pivots 51, as seen in Figs. 6 and 7. Intermediate its ends the lever W is connected by a pivot 59 to the upper end of the previously mentioned link W' which connects the lever W to one end of the floating lever T. Preferably the apparatus shown in Figs. 5 and 6 is so proportioned and arranged that when the lever DA is stationary midway between the ends of its oscillation range, the two springs 52 and 54 are subjected to equal compression forces, the pivot 58 is substantially in axial alignment with the trunnion pivot 51, and the pivot 57 is substantially in axial alignment with the trunnion pivots $K^3$ of the yoke KB.

With the apparatus so proportioned and arranged, turning movement of the lever DA will give a vertical adjustment to the abutment member KB in a direction depending on the direction of turning movement of the lever. Assume for example, that the vertical movement given the member KB is upward, as seen in Fig. 5. In such case, the movement of the member KB will compress the spring 52 and permit elongation of the spring 54. In consequence of the resultant change in the spring forces acting on the movable end walls of the two bellows chambers, the chamber PC will begin to contract and the chamber PD will begin to elongate. The rate at which one chamber contracts and the other elongates is dependent, as will be apparent, on the rate at which fluid flows from the chamber PC into the chamber PD past the restriction R in the conduit 56.

While such upward movement of the abutment member KB is directly dependent on the angular adjustment given the lever MB by the turning movement of the lever DA, the upward movement of the bellows walls 53 and 55 and the strut U connecting them, is dependent on the rate of flow of fluid past the restriction R in the conduit 56. The lag of the vertical movement of the strut U behind the vertical movement of the yoke KB is a function of the angular speed of the lever DA and of the speed of travel of the power cylinder piston to which the lever DA is connected. The lever W is a differential lever which has its right end, as seen in Fig. 5, depressed by clockwise turning movement of the lever MB at a rate directly proportional to the rate at which the lever MB turns. The left end of the lever W follows, but lags behind the movement of the yoke KB. The motion of the intermediate portion of the lever W to which the upper end of the link W' is connected by the pivot 59, is thus a function of the speed of the movement of the lever DA and of the power cylinder piston to which it is connected. The link W' thus operates through the floating lever T to produce rate control adjustment effects on pilot valve G, while the strut 29 acts on the lever T to subject the pilot valve to position control effects. The general character of the combined position and rate control actions obtainable with the apparatus shown in Figs. 5 and 6, is thus similar to that of the other forms of apparatus illustrated and described.

With all of the forms of the invention disclosed herein, the speed of movement of the power cylinder system is subject to a control action which is dependent on the distance between the actual position of the piston and the position into which it is to be moved and which serves to reduce the piston speed to zero as the piston moves into the last mentioned position. The piston positioning action is thus subject to control in accordance with the first differential of the rate at which the piston is moved into its control point position. Use of the invention makes the pneumatic power cylinder operate in a manner analogous to that in which a hydraulic power cylinder acts, in the sense and to the extent, that it precludes the surging or over-travel movements of the power cylinder piston which is an inevitable result of the fact that when the working fluid in the power cylinder is a gas, it will not prevent the piston movement due to the inertia of the moving system after the pilot valve closes, if that valve permits movement of the fluid into and out of the ends of the cylinder to continue until the piston reaches the position in which it should come to rest. The rate control action of the pilot valve included in the apparatus disclosed herein, is thus an anticipating valve action.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A speed control unit adapted for use in modifying the adjustment of a pilot valve which is effected on a change in the value of a controlling quanity to effect the movement of the piston of an air actuated power cylinder into a position predetermined by the value of said quantity, said unit comprising a pair of pressure chambers each having a movable wall, means for mechanically connecting each of said walls to said piston and operative on movement of the latter in one direction to move said walls to contract one and expand the other of said pressure chambers, and operative on movement of the piston in the opposite direction to expand the one and contract the other of said chambers, a pressure equalizing conduit including a restricted portion directly connecting said pressure chambers and a differential pressure device including an element actuated by and in accordance with the difference between the air pressures in said pressure chambers resulting from the expansion of one and the contraction of the other of said pressure chambers, and means for mechanically connecting said element to said pilot valve and operative when said element is so actuated to modify the adjustment of said valve and thereby slow down the movement of the piston as it approaches said position.

2. A speed control unit as specified in claim 1, in which said differential pressure device comprises two expansible chambers, one of which is connected to said conduit at one side of said restriction and the other of which is connected to said conduit at the second side of said restriction, each of said chambers having a movable wall rigidly connected to the movable wall of the other chamber whereby said movable walls collectively constitute the said element of the differential pressure device actuated by and in accordance with the difference between the pressures at said points.

3. A control unit as specified in claim 1, in which means for mechanically connecting the said element of the differential pressure device to said pilot valve includes a floating lever with separate connections for connecting said lever to the pilot valve and to means for giving the pilot valve the adjustments modified by the action of the speed control unit.

4. A speed control unit as specified in claim 1, in which the said element of the differential pressure device is moved linearly when actuated by and in accordance with the difference between the pressures at said points, and in which the means for mechanically connecting said element to the pilot valve is adapted to give the pilot valve linear movements similar in magnitude and direction to the movements given said element.

5. Speed control unit intended for use in modifying the adjustment of a pilot valve which is effected on a change in the value of a control quantity and causes the piston of an air actuated power cylinder to move into a position predetermined by the value of said quantity, said unit comprising a pair of chambers each having a stationary end wall, a movable end wall and a bellows connecting the two end walls, the two bellows being in axial alignment and said movable end walls being spaced apart and facing one another, a strut extending between said movable end walls, a conduit providing a restricted, pressure equalizing path of flow connected between and directly connecting said chambers, said chambers and conduit including fluid under a pressure not less than the pressure of the atmosphere, a spring abutment interposed between said walls and movable relative to said strut in the longitudinal direction of the latter, a separate spring connected between each of said movable end walls and said abutment, means for mechanically connecting said abutment to said piston to move said abutment longitudinally of said strut when said piston moves, and means for mechanically connecting said strut to said pilot valve.

6. A speed control unit intended for use in modifying the adjustment of a pilot valve which is effected on a change in the value of a control quantity and causes the piston of an air actuated power cylinder to move into a position predetermined by the value of said quantity, said unit comprising a pair of chambers each having a stationary end wall, a movable end wall and a bellows connecting the two end walls, the two bellows being in axial alignment and said movable end walls being spaced apart and facing one another, a strut extending between said movable end walls, a conduit providing a pressure equalizing, restricted path of flow connected between and directly connecting said chambers, said chambers and conduit including fluid under a pressure not less than the pressure of the atmosphere, a spring abutment interposed between said end walls and movable relative to said strut in the longitudinal direction of the latter, a separate compression spring connected between each movable end wall and said abutment, a lever pivotally connected to said abutment, a fulcrum pivot for said lever laterally displaced from the common bellows axis, means for mechanically connecting said lever to said piston to turn said lever about said pivot on movement of the piston in its cylinder, a second lever having one end pivotally connected to said strut and having its other end pivotally connected to the first mentioned lever at a distance from said axis, and means for connecting said pilot valve to said lever at a point intermediate its ends.

7. In control apparatus of the type comprising an air actuated power cylinder including a reciprocating piston, an expansible chamber having a wall movable to expand and contract said chamber, means for maintaining a controlling fluid pressure in said chamber which varies in predetermined correspondence with the value of a variable controlling quantity, a pilot valve operable on its adjustment away from a neutral position in one direction or in the opposite direction to unbalance the pressures in the ends of said cylinder and thereby move said piston in a direction depending on the valve adjustment direction, a mechanical connection between said movable wall and pilot valve through which the latter is adjusted in one direction or the other as said wall moves to contract or expand said chamber, a movable abutment, a spring acting between said movable wall and abutment and tending to move said wall in the direction to contract said chamber, and a mechanical connection between said piston and abutment through which the latter is given movements corresponding in magnitude and direction to the movements of said piston in said cylinder; the improvement comprising a pair of pressure chambers each having a movable wall member, a mechanical connection between each of said wall members and said piston whereby movement of the latter moves said wall members to respectively contract or expand one of said pressure chambers and to expand or contract the other pressure chamber, a conduit including a restricted portion connecting said pressure chambers and constituting the only pressure equalizing connection between said pressure chambers, a differential pressure device actuated by and in accordance with the difference between the pressures in said conduit at opposite sides of said restriction to modify the adjustment of said pilot valve to thereby retard the movement of the piston as it approaches a position in predetermined correspondence with the value of said pressure.

8. A control apparatus combination as specified in claim 7, in which the differential pressure device comprises two expansible chambers separately connected to said conduit, one at one side and the other at the opposite side of said restriction, and in which each of said chambers has a movable wall rigidly connected to the movable wall of the said expansible chamber in which the control pressure is maintained.

9. A control apparatus combination as specified in claim 7, including a floating lever through which the differential pressure device modifies the adjustment of the pilot valve, and to which said differential pressure device, the pilot valve and the movable wall of the first mentioned expansible chamber are connected at points longitudinally displaced from one another.

10. A control apparatus combination as specified in claim 7, in which each of said pressure chambers comprises a stationary end wall, a movable end wall and a bellows connecting the two end walls and in which the two bellows are in axial alignment between the two stationary end walls and the movable end wall of each chamber is rigidly connected to the movable end wall of the other chamber.

11. A control apparatus combination as specified in claim 7, in which each of said pressure chambers comprises a stationary end wall, a movable end wall and a bellows connecting said end walls, and in which said bellows are in axial alignment between the two stationary end walls and in which the movable end walls are spaced apart, and in which said piston is connected to each of said movable end walls through a common spring abutment intermediate said movable end walls and a separate compression spring is interposed between said abutment and each movable end wall and including a strut extending between and maintaining a fixed distance between said movable end walls, and in which said chambers and conduit contain fluid under a pressure not less than the pressure of the atmosphere, whereby said pressure chambers and strut constitute a differential pressure device, and in which said strut is mechanically connected to said pilot valve to modify the pilot valve adjustment effected by the first mentioned expansible chamber.

EDWIN CLARK BURDICK.

References Cited in the file of this patent

UNITED STATES PATENTS

| Number | Name | Date |
| --- | --- | --- |
| 2,102,007 | Kimball | Dec. 14, 1937 |
| 2,266,871 | Krogh | Dec. 23, 1941 |
| 2,312,464 | Ziebolz | Mar. 2, 1943 |
| 2,372,345 | Temple | Mar. 27, 1945 |

FOREIGN PATENTS

| Number | Country | Date |
| --- | --- | --- |
| 83,091 | Austria | Mar. 10, 1921 |